United States Patent [19]
Henry

[11] 3,813,657
[45] May 28, 1974

[54] GLIDE SLOPE INDICATOR
[76] Inventor: Richard Dale Henry, Hockstown Grade Rd., R.D. No. 1, Clinton, Pa.
[22] Filed: Apr. 24, 1972
[21] Appl. No.: 246,983

[52] U.S. Cl. .................................................. 340/26
[51] Int. Cl. .............................................. G08g 5/00
[58] Field of Search .................. 340/25, 26; 240/1.2

[56] References Cited
UNITED STATES PATENTS

| | | | |
|---|---|---|---|
| 2,280,126 | 4/1942 | Metcalf | 340/26 |
| 3,087,139 | 4/1963 | Finch | 340/26 |
| 3,259,985 | 7/1966 | Neal | 340/26 |
| 3,305,826 | 2/1967 | Kaplan | 340/26 |

FOREIGN PATENTS OR APPLICATIONS

| | | | |
|---|---|---|---|
| 225,839 | 12/1957 | Australia | 340/25 |

*Primary Examiner*—Kathleen H. Claffy
*Assistant Examiner*—Thomas L. Kundert
*Attorney, Agent, or Firm*—John A. Young

[57] ABSTRACT

A glide slope indicator consisting of an elevated rectangular light display is combined with two circular lights which are located at a lower elevation and are disposed laterally one at each side of the rectangular light display and are displaced from the rectangular light display in the direction of the landing aircraft along the length of the runway to form a subtended angle to the horizon, so that an aircraft on landing approach, will view the display and the combination of lights will appear colinear when the aircraft is on the proper glide slope approach. The two circular lights will appear above the rectangular light display at too steep a glide slope approach, and the two circular lights will appear below the level of the rectangular light display at too shallow glide slope approaches. The display provides a visual indication to aircraft on landing approaches so that the display at the proper glide slope approach will present the circular and rectangular lights as substantially colinear.

10 Claims, 13 Drawing Figures

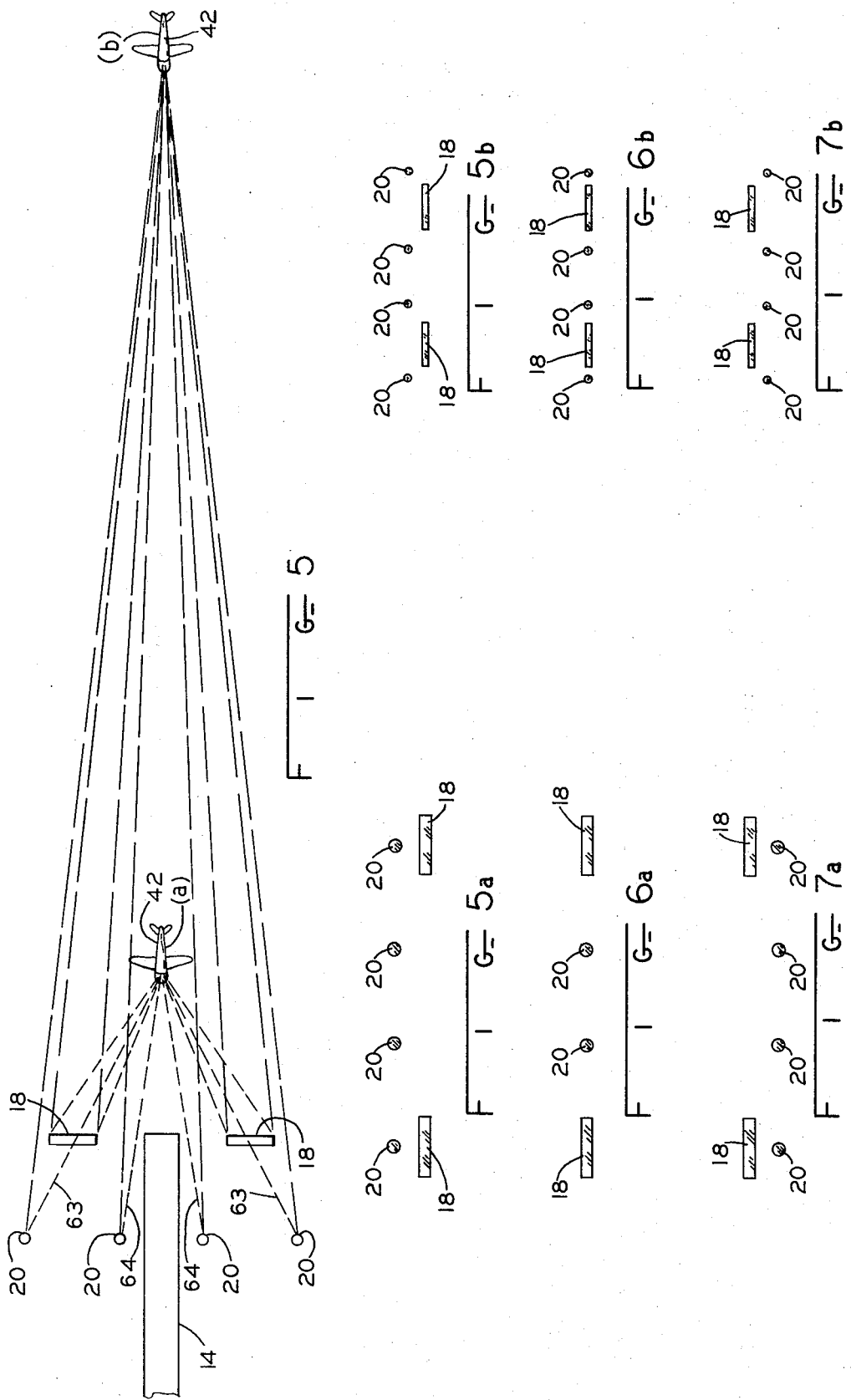

GLIDE SLOPE INDICATOR

BACKGROUND OF THE INVENTION

In making a visual approach, by a landing aircraft, the procedure is to guide the aircraft into a prescribed guide slope such that the speed of the aircraft, its elevation and distance from the end of the runway are all coordinated in a manner that the aircraft will land at the end of the runway at the prescribed speed and course. Landing an aircraft requires attention to a great number of details relating to course, power, direction, slope, etc., all of which must be properly maintained to make a suitable landing. What is required, is a visual means for indicating to the pilot whether he is at the proper glide slope and glide path and which, will further provide an indication as to the kind of deviation from the prescribed glide slope, should such deviations occur. Thus, if the pilot is approaching the runway at too steep a glide slope the indicator provides information that he is approaching at too steep an angle; conversely, should the pilot be directing the aircraft at too shallow a glide slope the indicator provides distinctly different display indicating that the angle is too shallow.

Since, as before stated, the pilot has a great number of operational parameters to be concerned with, in making a landing, the glide slope indicator should be as simple as possible and provide a readily intelligible display which is simple to read and interpret so as not to distract from other attention — demanding requirements in making the landing.

A number of different prior art proposals have been made regarding glide slope indicators but such proposals have not proved satisfactory either because they provide a display which is based upon color, and are hence subjective in readout, or they tend to be affected by weather conditions, and hence give false and unreliable information. If for example, as is presently being used, a series of runway lights are intended to appear one color at the prescribed glide slope and different colors in improper glide slopes, the light emanating from such sources can be varied depending upon climatic conditions. The guidance system is therefore essentially unreliable because it depends upon subjective interpretation and further because it is influenced by external changeable climatic conditions.

Various devices have been proposed as glide slope indicators and among those are the described series of runway lights having shutters which provide an apparent coloration depending upon the glide slope.

In other glide slope visual approach indicator means, the light indicator depends upon different angles with respect to the horizontal and which are mounted on a platform, but such devices tend to be complex in both operation and interpretation and depend upon gyroscopic stabilizing means.

What the art has long required is a visual glide slope indicating means which provides a simple and readily interpretable display which will indicate not only the correct glide slope but will further indicate incorrect glide slopes and what correction must be taken to establish the proper glide slope.

OBJECTS OF THE INVENTION

It is a primary object of the present invention to provide a glide slope indicator means which has a simple readily interpreted display which indicates whether the approaching aircraft is at the correct glide slope approach in making a landing.

A further object of the present invention is to provide a glide slope indicator which is independent of ambient conditions and which provides highly visible and readily interpreted visual display means, whereby the correct glide slope on approach can be readily determined.

A further object of the present invention is to provide a glide slope indicator which is readily adjustable to establish the correct glide slope for a given landing area and aircraft so that the same glide slope indicator can be adapted to different requirements found at various airports and landing fields so that for each of such different fields and airports the approaching aircraft is within the boundaries of the correct glide slope approach appropriate to that particular airport.

Another object of the present invention is to provide a readily discernable and interpretable glide slope indicator display which will not only indicate whether correct glide slope is established during approach but further indicate deviations and the kind of deviations, from the correct glide slope so that the pilot can take the necessary corrective action to make a proper approach within the prescribed glide slope.

It is an important feature of the present invention that the glide slope indicator can be readily mounted on aircraft carriers so that the pilot can land at the correct glide slope and at the correct roll angle as well. The pilot can determine both roll angle and glide slope on approach to make a landing on the deck of the carrier. The indicator is usable independently of the true and artificial horizon within the aircraft. An important advantage of the glide slope indicator of the present invention is that it establishes for the landing aircraft both glide slope and roll to optimize landing conditions on the pitching deck of an aircraft carrier.

An overall object of the present invention is to provide a glide slope indicator which is not only inexpensive to operate and to maintain but is also adaptable for any particular construction, size of runway, or location. That is to say, the glide slope indicator is readily adjustable so that if the glide slope must be established with a view in mind of avoiding surrounding hills or other interferring terrain, the visual display is adjustable so that incoming aircraft on approach can be brought within a glide slope of the correct degree of steepness of shallowness which takes into account the surrounding terrain in the vicinity of the approach for the aircraft. This consideration augments the safety and reliability of landing operations.

Other objects and features of the present invention will become apparent from a consideration of the following description which proceeds with reference to the accompanying drawings.

DRAWINGS

FIGS. 5(a) and 5(b) illustrate the display presented to the pilot at positions (a) and (b) of FIG. 5 and in which the glide slope is too steep;

FIGS. 6(a) and 6(b) illustrate the display seen by the pilot when the glide slope angle is proper and illustrating the display at positions (a) and (b) of the aircraft in FIG. 5; and, FIGS. 7(a) and 7(b) illustrate the display seen by the pilot if the glide slope is two shallow in positions (a) and (b) of the aircraft in FIG. 5.

DETAILED DESCRIPTION OF THE INVENTION

Figure 1:
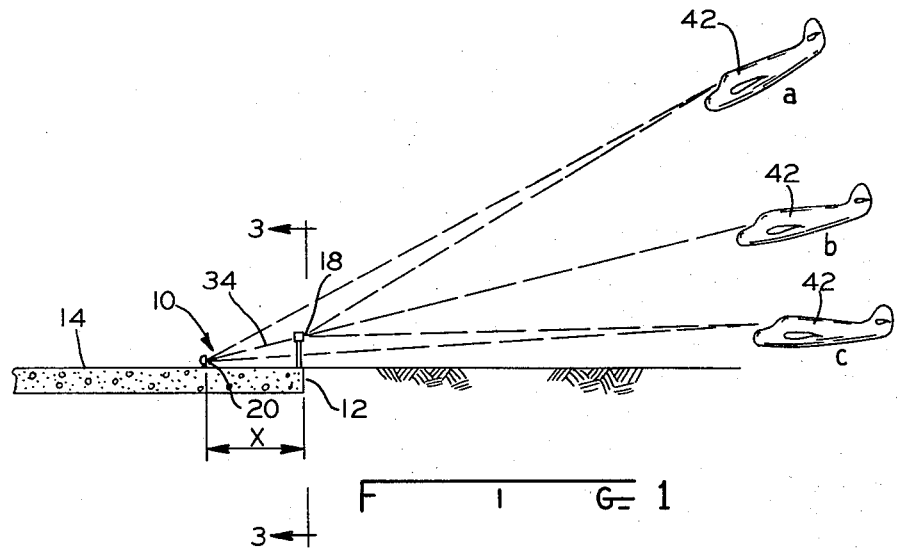
FIG. 1 is a side elevation view showing the glide slope indicator in conjunction with an aircraft (b) making an approach at the correct glide slope, the same aircraft (a) is shown in the upper portion of FIG. 1 at too steep a glide slope and the aircraft at position (c) of FIG. 1 illustrates an aircraft at too shallow a glide slope approach.
Figure 3:
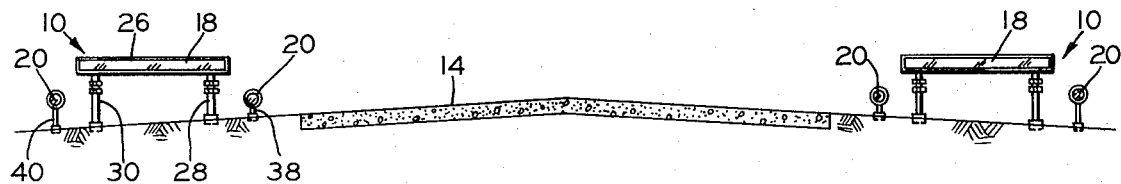
FIG. 3 is a ground level, front elevation view of the glide slope indicator means disposed one at each side of the runway.

A glide slope indicator designated generally by reference numeral 10 is disposed at the end 12 of a runway 14, there being one set of such indicators at each side of the runway as indicated in FIG. 3. The glide slope indicator consists essentially of a rectangular display 18 and two circular displays 20 located one at each side of the rectangular display and displaced a distance "X" in the direction of the landing aircraft as indicated in FIG. 1. Each of the displays 18, 20 is electrically illuminated or can be made of highly reflective material depending upon design considerations and preferences. The rectangular display 18 is disposed in advance of the two circular light displays 20 and the illuminating source is located within a casing 26 and is supported on two spaced posts 28 and 30 include screw-and-nut adjustments whereby they can be vertically adjusted to make a true horizontal display and vary the angle to the horizon subtended by a line 34 connecting light sources 20 and 18 and thereby variably define the glide slope angle (FIG. 1).

Figures 2A, 2B, 2C:
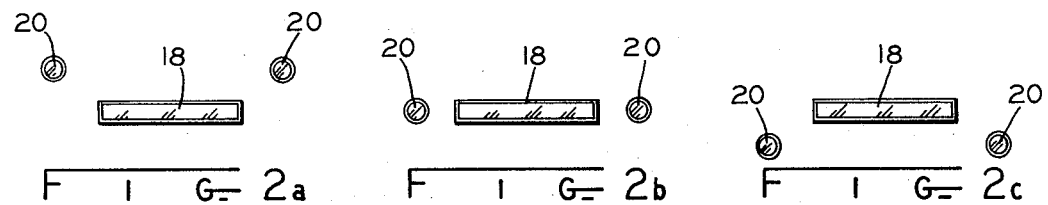
FIG. 2(a) represents the visual display made by the glide slope indicator when the glide slope on the approach is too steep as represented by the aircraft (a) at the uppermost part of FIG. 1.
FIG. 2(b) illustrates the display at the correct glide slope approach which is represented by the aircraft labeled b in FIG. 1; and, FIG. 2(c) illustrates the display of the glide slope indicator when the glide slope approach is too shallow illustrated by the aircraft in approach (c) of FIG. 1.

The circular lights 20 are similarly adjustable on posts 38 and 40 so that they likewise can be adjusted in a vertical sense. The rectangular 18 and circular 20 display lights provide a combined display for an aircraft during its approach as the aircraft aligns with the runway, prepared for landing. When aircraft 42 is in the position indicated in FIG. 1 the visual display appears in one or the other manners indicated in FIGS. 2a, 2b or 2c. When the two circular light displays 20 appear at a level above the rectangular light display 18 (FIG. 2a) the aircraft 42 is approaching the runway 14 at glide slope which is too steep represented by aircraft 42(a) in FIG. 1. When the glide slope of aircraft 42 is approaching in the manner indicated by 42(b) (FIG. 1) the glide slope creates the display of FIG. 2(b) wherein the two circular display lights 20 are disposed colinear with rectangular display light 18 so that the three light sources are all at the same level thereby indicating the correct glide slope. When the approaching aircraft 42 is in position c (FIG. 1) the two circular display lights 20 appear (FIG. 2c) at a lower level than the rectangular display light 18 indicating the glide slope is too shallow.

The display of lights is highly luminescent and can be seen from a substantial distance from the runway so that the display serves as a continuous guide source for the aircraft from the initial approach stage and continuously thereafter until the final stage of approach prior to flair out and landing.

OPERATION

In operation, the display device 10 is located at the end 12 of the runway 14 one on each side of the runway and is initially adjusted by raising or lowering display light 18 on the posts 28 or 30 to establish the desired approach or glide slope angle. The displays 18, 20 are then electrically illuminated or can be surfaced with highly reflective material.

As the pilot in aircraft 42 approaches the runway 14 he makes a "gunsight" aim on the glide slope indicator 10 and the airplane is directed into a glide slope angle so that it appears that the two circular spots 20 are colinear with the bar of light 18 at which time the aircraft is at the proper glide slope.

Should the aircraft be approaching at too steep a glide slope the two spots of light 20 will appear to be above the level of the rectangular light 18 and the aircraft is adjusted to compensate for the incorrect glide slope such that the two circular spots of light 20 are brought into colinear relationship with the bar of light 18. If the aircraft is approaching at too shallow glide slope the circular lights 20 will appear at a level below the light bar 18 and the aircraft glide slope is again corrected to a steeper angle such that the two circular lights 20 are again brought into colinear relationship with the bar of light 18. In other words, the pilot "flys" the two circular lights 20 relatively to the bar light 18. A glide slope indicator 10 is located one at each side of the runway as indicated in FIG. 3, one serving to check on the other, and to insure that at least one of the indicators is operative. Having one on each side of the runway serves a further function of correcting any parallax in the pilot and copilot seats.

Figure 4:
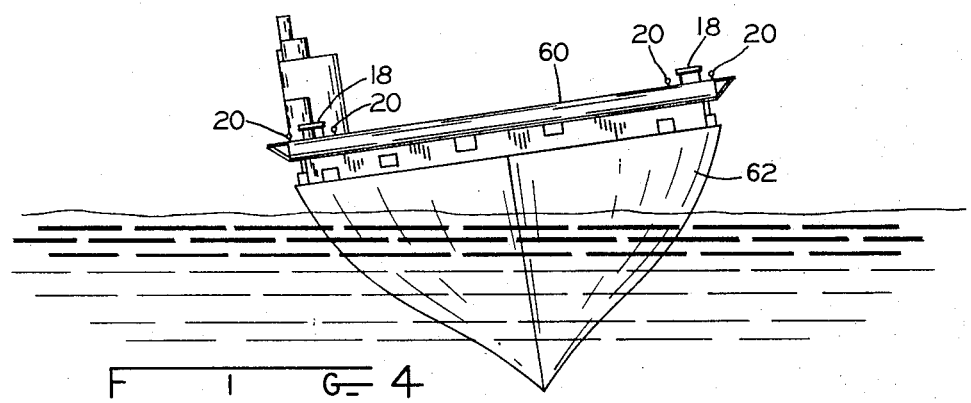
FIG. 4 illustrates mounting of the glide slope indicator means on the deck of an aircraft carrier to illustrate how the device establishes both the correct glide slope and roll for aircraft during their approach so that the aircraft will land at the correct roll and glide slope relatively to a pitching deck of an aircraft carrier.

As shown in FIG. 4, the display device 10 can be mounted on the deck 60 of an aircraft carrier 62 and the pilot directs the aircraft on final approach using both glide slope and roll guidance from display device 10 so that the aircraft is at a proper landing position at the time that it touches down on the deck 60. As noted in FIG. 4, the deck 60 has a tendency to roll in relation to the horizon so that the pilot would be mislead in following either the artificial or actual horizon relatively to the deck 60.

As shown in FIG. 5, 5(a), 5(b), 6(a)–6(b), 7(a)–7(b) as the aircraft approaches the end 12 of the runway 14 on the correct glide slope and progresses from position (b), FIG. 5, to position (a), FIG. 5, the outboard circular lights 20 at the terminal part of the glide slope will disappear behind the bar 18 of light. For example, the visual display of 6(b) becomes that of 6(a) as the aircraft moves from position b to position a in FIG. 5. This can be seen because the line of sight as indicated by the dotted line 63 causes the outboard circular lights to become concealed tempororily behind the bar of light but as indicated by the line of sight 64, the inboard circular light remains visible as shown in FIG. 6(a).

Should the pilot be approaching at an incorrectly steep glide slope the circular lights 20 of the display will always appear above the level of the bar 18 of light in either position b or position a (FIG. 5) of the aircraft to present display 5(a) and 5(b). Similarly, if the aircraft should be approaching on too shallow a glide slope the circular lights 20 will always appear below the level of the bar 18 of light as indicated in FIG. 7(b) and 7(a) for positions b and a (FIG. 5) respectively of the aircraft.

The visual display described requires esentially no training; all that is required, in order for a pilot to maintain a correct glide slope, is to maintain a colinear relationship of the circular lights 20 relatively to the bar light 18. The pilot simply flys the circular lights 20 and establishes the colinear relationship which insures that the proper glide slope is at all times maintained or it indicates the kind of deviation from the correct glide slopope and what must be done to bring the aircraft 42 into the correct glide slope.

One of the important advantages of the present invention is that the glide slope indicators are easy to interpret and are readily seen, and also requires substantially no maintenance (or minimum maintenance) and is adapted for both land and sea usage.

The device is furthermore economical to install and is easily adapted for landing fields of all sizes, constructions, as well.

In another embodiment of the invention, I reverse the relative location of the circular lights 20 and bar light 18 so that the circular lights are mounted above ground level in the manner shown in FIG. 3, and the bar light 18 is located at ground level. In this instance, the display to the approaching aircraft is such that the location is reversed, and the bar lights should then be brought in the colinear relationship with the circular lights instead of the operation of bringing the circular lights into colinear relationship with the bar lights. It may be, for ease of reading, quick recognition, and for various other reasons that it is preferable to reverse the relative locations indicated in FIGS. 1 and 3 of the respective displays. Such reversal of the displays in which (FIG. 3) the circular lights 20 are mounted on post 28 and 30 and the bar light 18 mounted on shorter posts 38 and 40 is well within the teaching of the present invention and it is intended that this relative reversal in position to the lights will be included within the scope of the following claim:

One of the important advantages of the present invention is that the sensitivity of the glide slope indicator can be varied depending upon the relative location between the circular display lights and the rectangular display lights. That is, referring to FIG. 1, the distance X which represents the longitudinal displacement of the bar light 18 from circular lights 20 can be increased and by doing so the subtended angle defining the glide slope is relatively narrowed and therefore the pilot is constrained to a much narrower approach angle thereby improving the accuracy of the approach. Conversely, the distance X can be foreshortened between 18 and 20 to increase the subtended angle and thereby increasing the glide slope angle which is followed by the pilot; but correspondingly, the accuracy is diminished. The particular range of glide slope angle which is determined by the relative displacement distance X is a matter of design preference and will be established for given runway locations and constructions and varies according to the terrain and landing procedures at a given selected airport. In other words, the sensitivity of the glide slope indicator is directly related to the distance X and the sensitivity is adjustable by carefully controlling the displacement distance X in accordance with the particular glide slope sensitivity which is desired.

Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the invention and it is intended that such revisions and adaptations will be included within the scope of the following claims as equivalents of the invention.

What I claim is:

1. A wholly ground contained glide slope indicator for aircraft landing comprising a first visual indicator disposed one at each side of the aircraft landing runway and at an elevated position to provide a first shaped sighting target between which the aircraft is guided for landing, a second visual indicator shaped substantially differently from said first visual indicator and disposed at locations laterally offset one at each side of a respective one of said first visual indicators and forming therewith subtended angles to the horizon defining the range of suitable approach angles wherein said indicators appear as differently shaped but collinear objects at the opposite sides of the end of the runway at the correct glide angle and are noncollinear at the incorrect approach glide angles.

2. A glide slope indicator in accordance with claim 1, wherein said first indicator appears visually to the approaching aircraft as a rectangular bar of light having a high degree of visibility and each of said second indicator means appears as a circular light disposed one at each side of said rectangular bar of light.

3. A glide slope indicator in accordance with claim 2 wherein said indicator means appear as noncollinear lights with the circular lights appearing above the rectangular light for glide slope approaches which are too steep and appearing below the rectangular light for too shallow glide slope angular approaches.

4. The glide slope indicator in accordance with claim 1 including means for adjusting the vertical position of said first and second indicator means relatively to each other and thereby establishing the correct angle of approach for the terrain at a given landing location.

5. The glide slope system in accordance with claim 1 wherein said glide slope indicator is constructed with one indicator means at each side of a runway at which the approach is made.

6. A glide slope indicator in accordance with claim 1 wherein said indicator is disposed on an aircraft carrier deck and is movable therewith to provide landing information including both the glide slope and the roll angle for the landing aircraft.

7. The glide slope indicator in accordance with claim 1 wherein said second indicator means is disposed laterally in relation to said first indicator means to be hidden at convergence angles of the pilot's view as the plane approaches terminal landing position and flares out prior to landing.

8. The glide slope indicator in accordance with claim 1 wherein the display presented to the pilot is composed of dissimilarly shaped first and second indicator means which are circular and rectangular respectively and are disposed collinearly at the proper glide slope and noncollinearly at the improper glide slope.

9. The glide slope indicator in accordance with claim 8 including means for electrically illuminating both said first and second indicator means to provide an illuminated display readily visible to the pilot of an approaching aircraft and to provide a highly visual image of said first and second indicator means.

10. The glide slope indicator in accordance with claim 1 wherein said first means consists of a pair of circular lights and said second indicator means is a rectangular bar of light both of which provide illuminated displays.

* * * * *